(No Model.) 2 Sheets—Sheet 1.
J. B. CORNWALL.
FEEDER FOR GRAIN SEPARATORS.
No. 533,529. Patented Feb. 5, 1895.
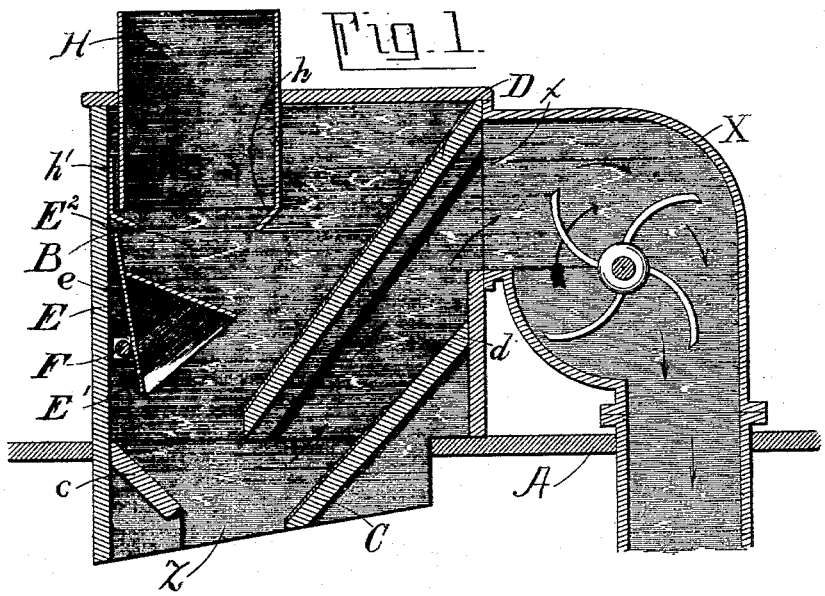
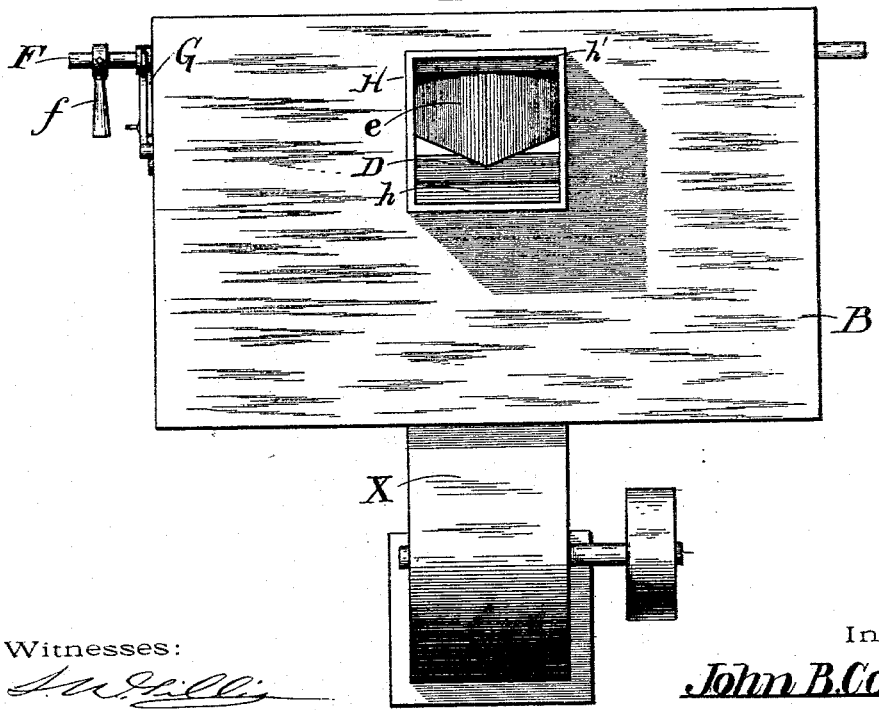
Witnesses:
Inventor.
John B. Cornwall,
by Alexander & Dowell
His Attorneys.

(No Model.) 2 Sheets—Sheet 2.

J. B. CORNWALL.
FEEDER FOR GRAIN SEPARATORS.

No. 533,529. Patented Feb. 5, 1895.

Witnesses:

Inventor.
John B. Cornwall,
by Alexander & Dowell
His Attorneys.

United States Patent Office.

JOHN B. CORNWALL, OF MOLINE, ILLINOIS, ASSIGNOR TO THE BARNARD & LEAS MANUFACTURING COMPANY, OF SAME PLACE.

FEEDER FOR GRAIN-SEPARATORS.

SPECIFICATION forming part of Letters Patent No. 533,529, dated February 5, 1895.

Application filed August 28, 1894. Serial No. 521,560. (No model.)

*To all whom it may concern:*

Be it known that I, JOHN B. CORNWALL, of Moline, in the county of Rock Island and State of Illinois, have invented certain new and useful Improvements in Feeders for Grain-Separators; and I do hereby declare that the following is a full, clear, and exact description thereof, reference being had to the accompanying drawings, and to the letters of reference marked thereon, which form part of this specification.

This invention is an improved grain-feeder for feeding grain of all kinds, including cobs and shelled corn, to grain separating machines, and also applicable to and useful with other milling machines, where an even flow of material from the hopper is desired.

It consists in the novel construction of the spreader, and the combination thereof with other parts, all of which will be understood from the following description in connection with the drawings, in which—

Figure 3:
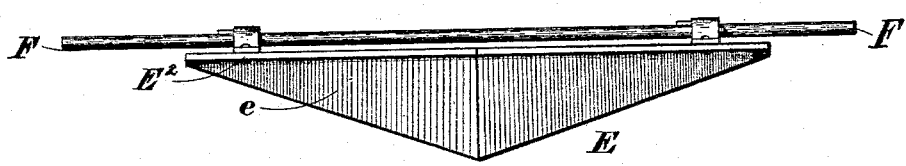
Figure 4:
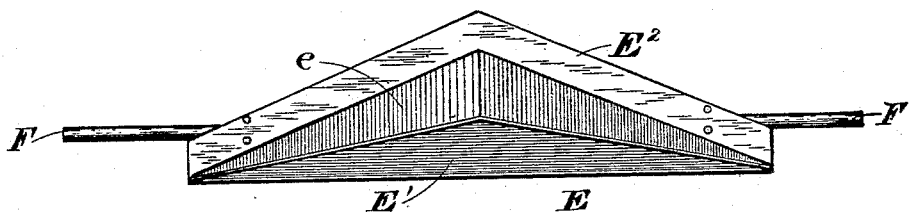
Figure 5:
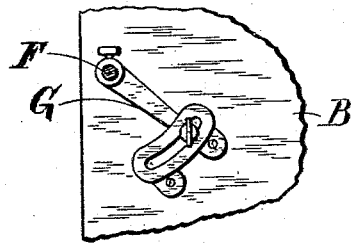

Figure 1 is a central vertical section through the feeder and spreader as applied to a grain separator. Fig. 2 is a detail top view of the feeder. Fig. 3 is a top plan view of the spreader mounted on its shaft. Fig. 4 is a front view thereof. Fig. 5 is a detail of the spreader adjusting devices.

A designates the feed end of a grain separator. B is the feeder box connected thereto. This feeder has two oppositely inclined chute boards C, c, at the bottom, the inner board C, inclining rearwardly and upwardly to a point considerably above the board c. The opening Z between the lower edges of said boards is where the grain passes from the feeder into the separator.

Above and substantially parallel with board C is an inclined partition D, the rear end of which extends to the upper rear corner of the feed-box, and its lower end projects beyond the vertical plane of the lower end of board C.

The space d between boards C, D, forms an air passage communicating with the fan casing X, through a spout x, so that a current of air can be exhausted from the separator through the feed-box, to separate light impurities from the grain being fed into the machine.

The spreader E, is located at the front side of the box above board c, and the lower end of board D. This spreader is mounted on a shaft F, lying transversely of the box and suitably journaled in the walls thereof. The feeder is made of sheet iron or other suitable material and is triangular in cross section having a front piece e and rear piece E'. The front piece e is widest at center and tapers toward each end (side of box) and is also inclined from its center on each side downward to its ends. The rear edge of piece e is fastened to the piece E' near the upper edge thereof, and at an angle of about fifty degrees thereto, and the upper edge of piece E' projects sufficiently above the edge of plate e, as to constitute a flange $E^2$, at the upper edge of the spreader, the upper edge of plate E' being beveled downward from its center on both sides as shown.

The plate E' is securely bolted on the shaft F as shown. The shaft is loosely mounted in the feeder box and can be shifted longitudinally by the hand piece f, so as to adjust the spreader longitudinally in the feed box; and said shaft can be partly turned by a crank-arm G, on its outer end, which arm has a thumb screw engaging a slotted keeper G' attached to the end of the feed box, for locking the shaft when adjusted.

When the spreader is in about normal position plate E' will be almost vertical and the center line or ridge of plate e will stand almost horizontal and above the lower end of board D.

Above the spreader is a spout H, fixed in the top of the box and adapted to deliver material onto the spreader. This box has an inclined flange or deflector h on its lower inner edge, to direct the grain onto the spreader, and a similar but oppositely facing deflector h' is attached to the outer side of the spout, or to the side of box proximate to the spout as shown.

The operation is as follows:—The grain entering spout H is directed onto the spreader E which deflects it in an even shower the full length of the box, and it passes down through the opening Z into the machine. Should more grain pass down one of the inclined sides of the spreader than the other, the spreader can be moved endwise (by shifting shaft F) until the discharge is uniform on both sides. Should more grain pass down the inclines of the spreader than will equalize the amount passing over their edges, the spreader can be tilted forward by partially turning shaft F, until the stream of grain is uniform in amount the full width of the discharge. The openings in and out of the box and the passages through it, may be large enough to admit of feeding shelled corn and cobs, as they come from a power corn-sheller, without choking.

It will be observed that the shape of the spreader is novel, and that it is adjustable both laterally and longitudinally in the box.

The flange $E^2$ is useful to prevent the material fed onto the spreader passing over the rear edge thereof, and affords convenient points for attachment to rod F. Its upper edge is made double inclined as shown so that straws, husks, strings, &c., which may fall thereon will slide down the inclines and pass out, instead of hanging over the edge or slipping off between the rolls.

Having thus described my invention and in what manner the same is to be performed, I declare that what I claim as new, and desire to secure by Letters Patent thereon, is—

1. In a grain feeder the combination of the box having an inlet spout, and a bottom outlet; with the double inclined spreader constructed substantially as described, mounted on a shaft and adjustable both laterally and lengthwise, and means for locking it in position after adjustment, substantially as described.

2. The combination of the feed box, and the longitudinally and rotatably adjustable shaft mounted therein; with the double inclined spreader E mounted on and adjustable with said shaft, substantially as described.

3. The combination of the feed box having feed and outlet openings; with the double inclined and tapered deflector mounted in said box over the outlet opening and means for adjusting it both longitudinally and rotatably within the box, substantially as described.

4. The combination with the feed box having top and bottom openings and an inclined air passage at one side of, above and communicating with, the lower opening; with the longitudinally and rotatably adjustable double inclined spreader mounted in the box above the lower end of said air passage, and means for adjusting said spreader, substantially as described.

5. The herein described spreader, consisting of the back plate E having its upper edge tapered downwardly from its center in both directions; the plate e fastened at its rear edge to plate E near and parallel with the beveled edge thereof said plate e being inclined to plate E and also widest at center and tapered from center to ends at its front edge; in combination with the longitudinally and rotatably adjustable shaft fastened to the rear side of plate E near its lower edge for supporting and adjusting it, all substantially as and for the purpose set forth.

6. In a grain separator, the combination of the feed box having an inlet spout, inclined boards c, C, D; passage d, between boards C, D; the double inclined spreader E; and the adjustable spreader supporting shaft F; with means whereby air is drawn through the passage d and the grain air-screened as it falls from the spreader, all constructed and arranged substantially as and for the purpose set forth.

In testimony that I claim the foregoing as my own I affix my signature in presence of two witnesses.

JOHN B. CORNWALL.

Witnesses:
J. SILAS LEAS,
A. H. JOSEPH.